(12) United States Patent
Wysocki et al.

(10) Patent No.: US 6,396,623 B1
(45) Date of Patent: May 28, 2002

(54) WIDE-BAND OPTICAL AMPLIFIERS WITH INTERLEAVED GAIN STAGES

(75) Inventors: Paul F. Wysocki, Flemington, NJ (US); William S. Wong, San Jose, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/772,847

(22) Filed: Jan. 31, 2001

Related U.S. Application Data
(60) Provisional application No. 60/256,343, filed on Dec. 19, 2000.

(51) Int. Cl.[7] .................................................. H01S 3/00

(52) U.S. Cl. ..................................... 359/337.4; 359/349

(58) Field of Search .............................. 359/341.1, 349, 359/337.4

(56) References Cited

U.S. PATENT DOCUMENTS

| | | | | |
|---|---|---|---|---|
| 5,673,280 A | | 9/1997 | Grubb et al. ................... | 372/3 |
| 5,859,938 A | | 1/1999 | Nabeyama et al. ............ | 385/24 |
| 5,900,969 A | | 5/1999 | Srivastava et al. .......... | 359/341 |
| 6,038,356 A | | 3/2000 | Kerfoot et al. ................ | 385/24 |
| 6,049,413 A | | 4/2000 | Taylor et al. ................ | 359/337 |
| 6,061,171 A | | 5/2000 | Taylor et al. ................ | 359/341 |
| 6,081,366 A | | 6/2000 | Kidorf et al. ................ | 359/341 |
| 6,094,298 A | | 7/2000 | Luo et al. .................... | 359/346 |
| 6,115,174 A | | 9/2000 | Grubb et al. ................ | 359/334 |
| 6,134,047 A | | 10/2000 | Flood et al. ................. | 359/341 |
| 6,178,038 B1 | | 1/2001 | Taylor et al. ................ | 359/341 |
| 6,198,572 B1 | | 3/2001 | Sugaya et al. ............... | 359/337 |
| 6,215,581 B1 | | 4/2001 | Yadlowsky ................... | 359/337 |
| 6,233,092 B1 | * | 5/2001 | Flood et al. .................. | 359/345 |
| 6,307,668 B1 | * | 10/2001 | Bastein et al. ............. | 359/337.1 |
| 6,310,716 B1 | * | 10/2001 | Evans et al. ................. | 359/334 |

FOREIGN PATENT DOCUMENTS

| | | |
|---|---|---|
| EP | 0 734 105 A2 | 9/1996 |
| WO | WO 98/15042 | 4/1998 |
| WO | WO 00/14909 | 3/2000 |
| WO | WO 00/49721 | 8/2000 |

OTHER PUBLICATIONS

Sun et al. "Optical Fiber Amplifiers for WDM Optical Networks" Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al. "Active Gain Tilt Equalization by Preferentially $1.43\mu m-$ or $1.48\mu m-$ Pumped Raman Amplification" OSA Optical Amplifiers and their Applications, vol. 30, p. 101–105 (1999).

(List continued on next page.)

*Primary Examiner*—Mark Hellner
(74) *Attorney, Agent, or Firm*—Fish & Neave; G. Victor Treyz

(57) ABSTRACT

Amplifiers having multiple gain stages are provided. Some of the gain stages provide gain in a first wavelength band and some of the gain stages provide gain in a second wavelength band. The gain stages that provide gain in the first band are interleaved with the gain stages that provide gain in the second band. The gain stages may be based on rare-earth-doped fiber amplifiers, Raman-pumped fiber amplifiers, or other suitable optical amplifiers. Gain stages may be used that include parallel amplifier branches. Each of the parallel branches may handle a separate wavelength range.

21 Claims, 8 Drawing Sheets-

OTHER PUBLICATIONS

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Zhu et al. "1.28 Tbit/s (32×40 Gbit/s) Transmission over 1000 km NDSF Employing Distributed Raman Amplification and Active Gain Flattening" Electronics Letters, vol. 37, No. 1, p. 43–45 (Jan. 4, 2001).

Emori et al. "Cost–Effictive Depolarization Diode Pump Unit Designed for C–band Flat Gain Raman Amplifiers to Control EDFA Gain Profile" p. 106–108.

Sun et al. "Average Inversion Level, Modeling and Physics of Erbium–Doped Fiber Amplifiers" IEEE Journal of Selected Topics in Quantum Electronics, vol. 3, No. 4, Aug. 1997.

\* cited by examiner

WIDE-BAND OPTICAL AMPLIFIERS WITH INTERLEAVED GAIN STAGES

This application claims the benefit of provisional patent application No. 60/256,343, filed Dec. 19, 2000.

BACKGROUND OF THE INVENTION

The present invention relates to optical amplifiers, and more particularly, to optical amplifiers such as those used in fiber-optic communications networks.

In optical networks that use wavelength division multiplexing, multiple wavelengths of light are used to support multiple communications channels on a single fiber. Optical amplifiers are used in such networks to amplify optical signals that have been subject to attenuation over fiber-optic links. It is desirable for amplifiers to have wide optical bandwidths, so that a large number of communications channels may be carried.

A typical amplifier may include erbium-doped fiber amplifier components that are pumped with diode lasers. Raman amplifiers have also been used that provide optical gain through stimulated Raman scattering. Erbium-doped amplifiers may be configured to operate in the C-band wavelength region (approximately 1530 nm to 1565 nm) or the L-band wavelength region (approximately 1565 nm to 1615 nm). Erbium amplifiers that handle both C-band and L-band signals have also been developed. Such amplifiers use a wavelength demultiplexer and wavelength multiplexer to route signals through parallel C-band and L-band amplifier branches. Signals in the C-band are routed through the C-band amplifier branch. Signals in the L-band are routed through the L-band branch. This type of parallel arrangement provides a wide amplifier bandwidth, but may require the use of a guard band to avoid multipath interference problems.

The wavelength and bandwidth of a Raman amplifier may be determined by choosing the wavelengths of the Raman pump or pumps used to produce the gain. However, it may be difficult to produce a Raman amplifier that has a bandwidth larger than 100 nm, because this would cause the longest wavelength pump to be located in the short wavelength region of the signal band.

One possible approach for increasing amplifier bandwidth is to combine amplifiers that operate in different wavelength bands in series. With this type of arrangement, signals pass sequentially through each of the amplifiers. Guard bands are not required, but there may be stringent requirements for the separate amplifiers. Each amplifier must amplify within its designed band while allowing signals to pass in other bands for amplification by the other amplifiers. In the ideal situation, each amplifier would produce absolutely no loss or noise in the band of the other amplifiers. This would allow amplifiers to be combined in series in any order without any performance degradation. However, it is not possible to produce an amplifier with such ideal characteristics in practice.

When two amplifiers are combined in series, each amplifier generally produces loss in the gain band of the other amplifier. For example, the first amplifier in the series may contribute a loss in the gain band of the second amplifier in the series. This will increase the noise figure of the amplifier in the gain band of the second amplifier. If the order of the amplifiers is reversed, so that the first amplifier follows the second amplifier, the output power in the gain band of the second amplifier will be reduced. In some situations, one amplifier may produce a small gain in the gain band of the other amplifier, rather than a loss. However, all gain is accompanied by noise. The introduction of a poorly performing (low gain) amplifier either before or after a high performance amplifier will therefore degrade performance in the gain band of the high-performance amplifier.

It is an object of the present invention to provide wideband amplifiers for use in optical communications systems.

It is also an object of the present invention to provide amplifiers for use in optical communications systems in which amplifier stages corresponding to different wavelength bands are interleaved with each other to improve the overall performance of the amplifier.

SUMMARY OF THE INVENTION

These and other objects of the invention are accomplished in accordance with the present invention by providing amplifiers having multiple gain stages. Some of the gain stages provide gain in a first wavelength band and some of the gain stages provide gain in a second wavelength band. The gain stages that provide gain in the first band are interleaved with the gain stages that provide gain in the second band.

The gain stages may be based on rare-earth-doped fiber amplifiers, Raman-pumped fiber amplifiers, or any other suitable optical amplifiers.

If desired, gain stages may be used that include parallel amplifier branches. Each of the parallel branches may handle a separate wavelength range.

Further features of the invention and its nature and various advantages will be more apparent from the accompanying drawings and the following detailed description of the preferred embodiments.

DETAILED DESCRIPTION OF THE PREFERRED EMBODIMENTS

The present invention relates to optical amplifiers. For clarity, the present invention will be described primarily in the context of fiber amplifiers for fiber-optic communications networks. This is, however, merely illustrative.

Figure 1:
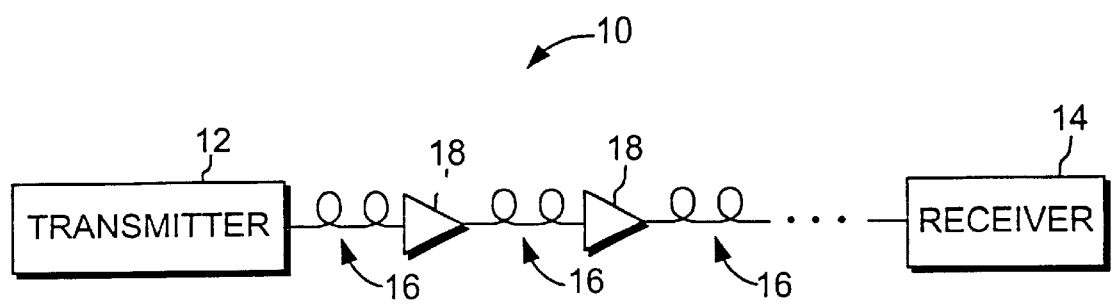
FIG. 1 is a schematic diagram of an illustrative optical communications link using amplifiers with interleaved gain stages in accordance with the present invention.

An illustrative optical communications link 10 that may use optical amplifiers in accordance with the present invention is shown in FIG. 1. A transmitter 12 may transmit information to a receiver 14 over a series of fiber links. Each fiber link may include a span 16 of optical fiber. Fiber spans may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1550 nm. These are merely illustrative system characteristics. If desired, more channels may be provided (e.g., hundreds of channels), signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1650 nm).

Figure 2:
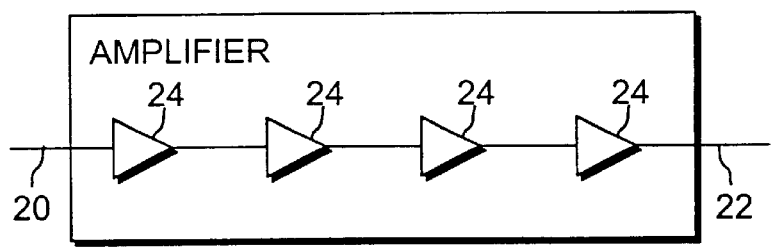
FIG. 2 is a schematic diagram of an illustrative amplifier with interleaved gain stages in accordance with the present invention.

Optical amplifiers 18 may be used to amplify the optical signals between successive spans of fiber 16. An illustrative optical amplifier 18 is shown in FIG. 2. Optical input signals are provided at fiber input 20 and corresponding amplified output signals are provided at output fiber 22. Multiple amplifier stages 24 provide optical gain. Gain stages 24 may be based on Raman-pumped fiber amplifier stages, rare-earth-doped fiber or waveguide amplifier stages such as erbium-doped fiber or waveguide amplifier stages, or any other suitable amplifiers stages. Amplifier 18 of FIG. 2 is shown as having five gain stages 24. This is merely illustrative. Amplifier 18 may have three, four, five, six, seven, eight, or more stages or any other suitable number of gain stages. Amplifiers such as amplifier 18 may also have additional components such as variable optical attenuators, dispersion compensation modules, telemetry channel filters, isolators, pumps, taps, spectral filters, etc.

Figure 3:
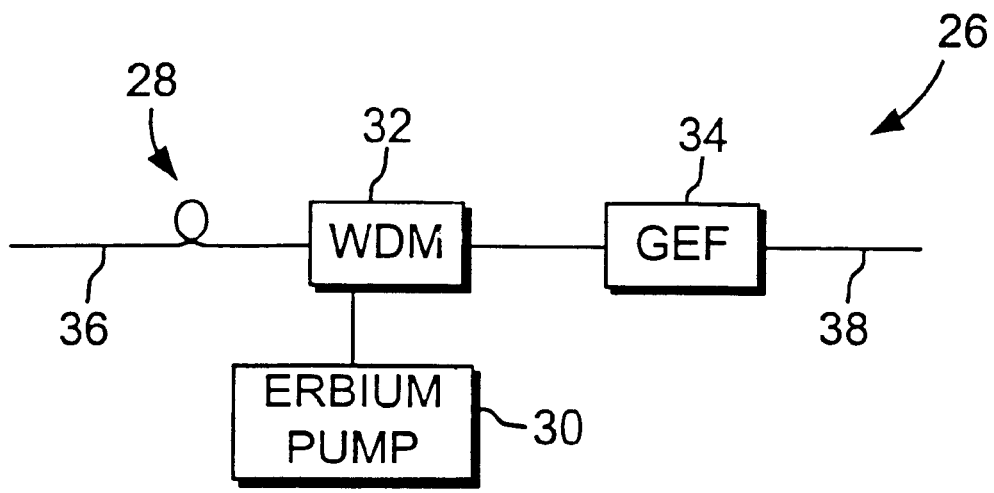
FIG. 3 is a schematic diagram of an illustrative erbium-doped-fiber amplifier stage in accordance with the present invention.

A typical rare-earth-doped fiber amplifier stage is an erbium-doped fiber amplifier stage. An illustrative erbium-doped fiber amplifier stage 26 is shown in FIG. 3. Erbium-doped fiber coil 28 may be optically pumped using erbium pump 30. Erbium pump 30 may be one or more diode lasers such as diode lasers operating at 980 nm or 1480 nm or other suitable wavelengths. Pump light from pump 30 may be coupled into fiber 28 using wavelength-division-multiplexing coupler 32 or other suitable coupler. If desired, pump coupling arrangements based on circulators may be used to pump fiber 28. A gain equalization filter 34 or other spectral filter may be used to flatten or otherwise spectrally modify the gain spectrum of fiber 28. Gain stage 26 amplifies the optical signals provided at input fiber 36 and provides amplified output signals at output 38. In the example of FIG. 3, erbium coil 28 is counter-pumped. This is merely illustrative. Erbium coil 28 may be counter-pumped, co-pumped, or simultaneously co-pumped and counter-pumped if desired.

Figure 4:
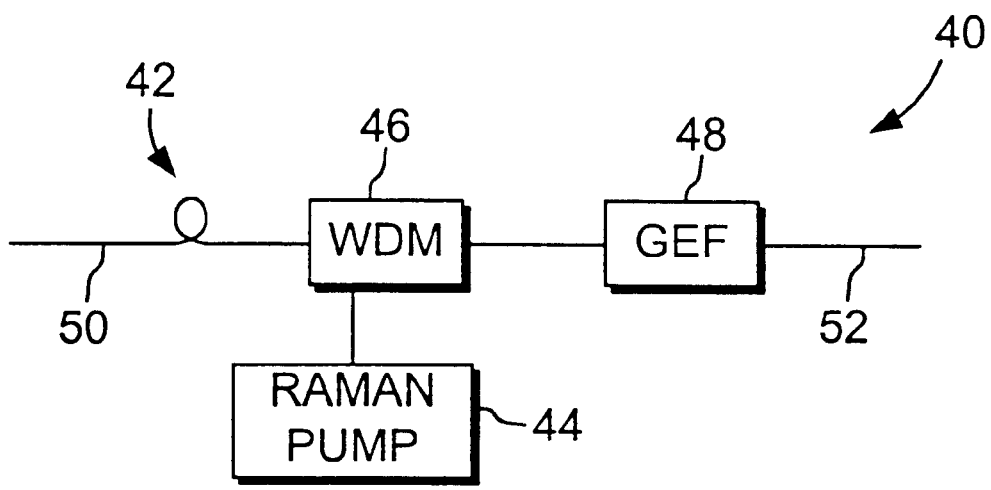
FIG. 4 is a schematic diagram of an illustrative Raman amplifier stage in accordance with the present invention.

An illustrative Raman amplifier gain stage 40 is shown in FIG. 4. Optical signals to be amplified are provided to input fiber 50. Amplified output signals are provided at fiber output 52. Raman fiber 42 may be optically-pumped by Raman pump 44 to produce Raman gain through stimulated Raman scattering. Pump coupler 46, which may be, for example, a wavelength-division-multiplexing coupler or other suitable coupler may be used to couple pump light from pump 44 into fiber 42. If desired, pump coupling arrangements based on circulators may be used to pump Raman fiber 42. Raman fiber 42 may be any suitable optical fiber. For example, Raman fiber 42 may be a discrete coil of single mode fiber that has been optimized to produce a relatively large amount of Raman gain or loss per unit length of fiber or may be dispersion-compensating fiber. Fiber that has a relatively small core area may sometimes be preferable to fiber that has a relatively large core area, because this improves Raman pumping efficiency.

In the example of FIG. 4, fiber 42 is counter-pumped. This is merely illustrative. Fiber 42 may be counter-pumped, co-pumped, or simultaneously co-pumped and counter-pumped if desired.

Pump 44 may use any suitable source of pump light at a single or multiple wavelengths. For example, pump 22 may include one or more diode lasers, each operating at a separate wavelength. Pump 22 may also use one or more tunable diode lasers, each of which is capable of tuning over a range of wavelengths. If desired, tunable or fixed-wavelength pumps based on fiber lasers may be used.

Any suitable number of pump wavelengths may be used to pump fiber 42. When more pump wavelengths are used, a wider and flatter gain spectrum may be produced (within the limits imposed by the characteristic Raman spectral shape). When fewer pump wavelengths are used, system complexity may be reduced. If desired, a gain equalization (gain flattening filter) 48 or other spectral filter may be used to flatten or otherwise modify the gain spectrum of fiber 42.

Control units may be used to control the pumps and other components of amplifier stages such as stage 26 of FIG. 3 and stage 40 of FIG. 4. Control units may be based on any suitable control electronics such as one or more microprocessors, microcontrollers, digital signal processors, programmable logic devices, application-specific integrated circuits, etc. A different control unit may control each amplifier stage or a single control unit may be used to control multiple stages.

In general, a number of erbium amplifier stages such as stage 26 of FIG. 3 may be cascaded to form a C-band or L-band erbium-doped fiber amplifier. Multiple Raman amplifier stages such as Raman stage 40 of FIG. 4 may be cascaded to form a Raman amplifier. The gain spectra of the Raman amplifier may be chosen to be complementary to the gain spectrum of the erbium amplifier.

Figure 5:
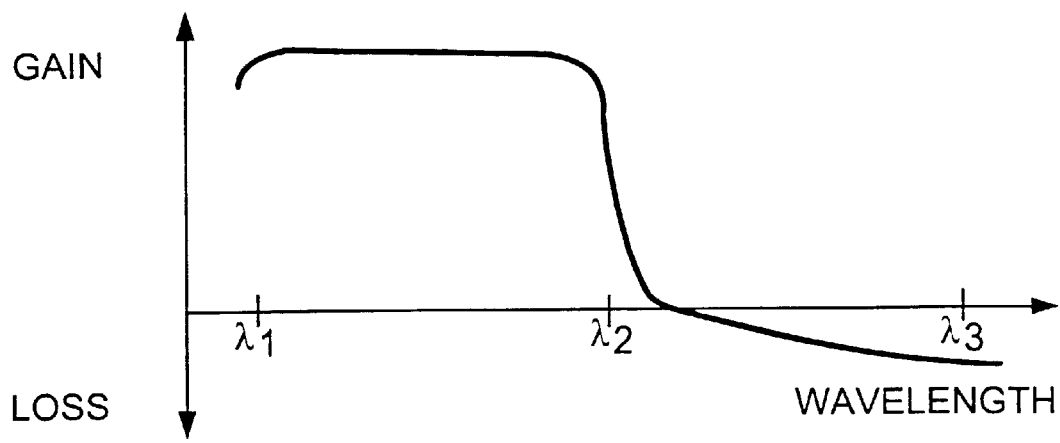
FIG. 5 is a schematic diagram of an illustrative gain spectrum for an amplifier stage that operates over a first wavelength range in accordance with the present invention.
Figure 6:
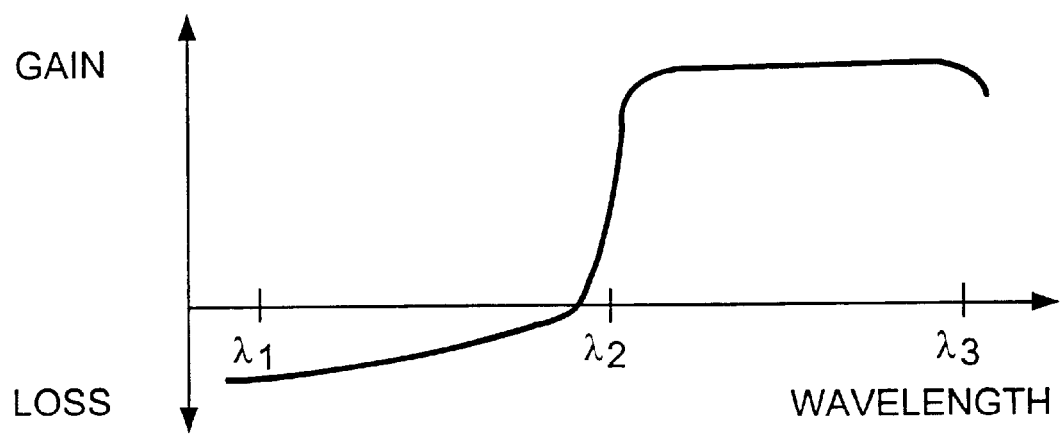
FIG. 6 is a schematic diagram of an illustrative gain spectrum for an amplifier stage that operates over a second wavelength range in accordance with the present invention.

Illustrative gain spectra are shown in FIGS. 5 and 6. In this example, which is merely illustrative, the gain spectrum of FIG. 5 is a flattened erbium gain spectrum and the gain spectrum of FIG. 6 is a flattened Raman gain spectrum. The erbium spectrum provides amplification in the wavelength band from $\lambda_1$ to $\lambda_2$. The Raman gain spectrum provides amplification in the wavelength band from $\lambda_2$ to $\lambda_3$. There is overlap, so that the two amplifiers may be combined to form a single wide-band amplifier covering the wavelength range from $\lambda_1$ to $\lambda_3$.

Although a wide-band amplifier might be formed by combining the erbium and Raman amplifiers in series, doing so without interleaving the stages of each amplifier may give rise to either a large noise figure penalty or a large output power penalty. In accordance with the present invention, stages from one amplifier (e.g., the erbium amplifier) are interleaved between stages from the other amplifier (e.g., the Raman amplifier) to produce a wide-band amplifier.

Figure 7:
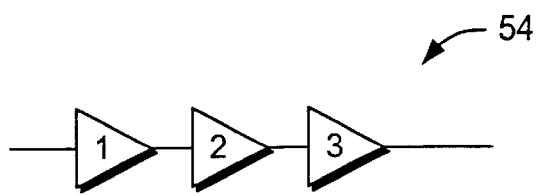
FIG. 7 is a schematic diagram of an illustrative three-stage amplifier operating over a first wavelength range.

This is shown in FIGS. 7–12. One illustrative three-stage amplifier 54 without interleaving is shown in FIG. 7. Amplifier 54 of FIG. 7 may be, for example, an erbium amplifier having a gain spectrum of the type shown in FIG. 5. Amplifier 54 may have gain stages 1, 2, and 3 of the type shown in FIG. 3. Each gain stage in amplifier 54 may include a gain medium (e.g., erbium-doped fiber) and may include other components (e.g., variable optical attenuators, dispersion compensation modules, telemetry channel filters, isolators, pumps, taps, spectral filters, etc.). The losses from the passive components may be lumped into the gain stages.

Figure 8:
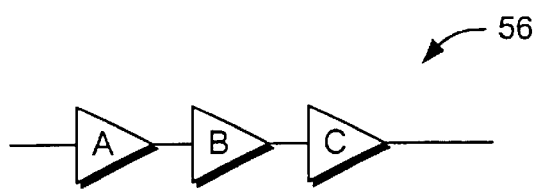
FIG. 8 is a schematic diagram of an illustrative three-stage amplifier operating over a second wavelength range.
Figure 9:
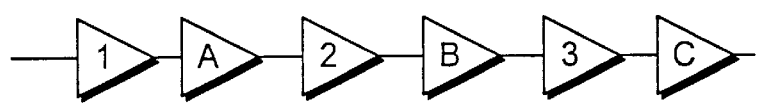
FIGS. 9–12 are schematic diagrams of illustrative amplifiers having interleaved amplifier gain stages selected from the gain stages of FIGS. 7 and 8 in accordance with the present invention.
Figure 10:
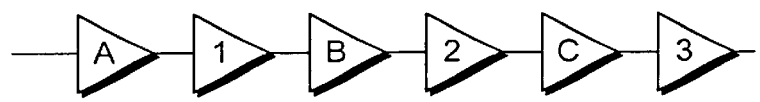
Figure 11:

Another illustrative three-stage amplifier 56 without interleaving is shown in FIG. 8. Amplifier 56 of FIG. 8 may be, for example, a Raman amplifier having a gain spectrum of the type shown in FIG. 6. Amplifier 56 may have gain stages A, B, and C of the type shown in FIG. 4. Each gain stage in amplifier 56 may include a gain medium (e.g., Raman fiber) and may include other components (e.g., variable optical attenuators, dispersion compensation modules, telemetry channel filters, isolators, pumps, taps, spectral filters, etc.). The losses from the passive components may be lumped into the gain stages.

The examples of FIGS. 7 and 8 are based on three-stage amplifiers. This is merely illustrative. These multistage amplifiers may include any suitable number of stages.

Figure 12:
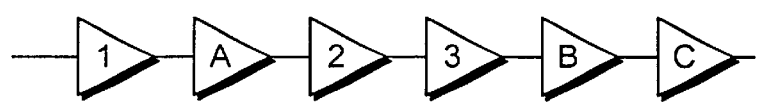

Stages from amplifier 54 of FIG. 7 may be interleaved with stages from amplifier 56 of FIG. 8 using any suitable arrangement. Illustrative interleaved amplifiers that may be formed by combining the gain stages of FIG. 7 with the gain stages of FIG. 8 are shown in FIGS. 12. In the FIG. 9 configuration, the stages from each respective amplifier 54 or 56 alternate with each other. In the FIG. 10 configuration, the stages from each amplifier 54 or 56 alternate as in the FIG. 9 configuration, except that the initial gain stage has been selected from amplifier 56, rather than the amplifier 54. The FIG. 11 and FIG. 12 configurations show how two or more of the gain stages operating in the same band may be clustered together, even though the overall amplifier arrangement involves interleaving.

If all three stages of amplifier 56 are placed in series after all three stages of amplifier 54 (i.e., if the combined amplifier does not use gain stage interleaving), a noise penalty will result in the wavelength band from $\lambda_2$ to $\lambda_3$ ("band 2") and a power penalty will result in the wavelength band from $\lambda_1$ to $\lambda_2$ ("band 1"). If all three stages of amplifier 56 are placed before all three stages of amplifier 54, this will produce a noise penalty in the band from $\lambda_1$ to $\lambda_2$ (band 1) and a power penalty in the band from $\lambda_2$ to $\lambda_3$ (band 2).

Interleaving tends to reduce and balance these penalties. For example, the penalty produced by amplifier 56 in band 1 may be reduced by splitting the stages of amplifier 54 into two parts and placing all three stages of amplifier 56 between the two parts of amplifier 54. Similarly, placing a portion of amplifier 56 between parts of amplifier 54 will improve performance. Performance may be further enhanced by breaking up amplifiers such as amplifiers 54 and 56 into three or more parts each and interleaving these parts with each other as shown in FIGS. 9–12.

In general, whenever one group of gain stages (e.g., the group of three stages in FIG. 7 corresponding to the erbium-fiber gain medium) produces the majority of the gain in one wavelength band (e.g., band 1), whereas another group of gain stages (e.g., the group of three stages in FIG. 8 corresponding to the Raman-fiber gain medium) produces the majority of the gain in another wavelength band (e.g., band 2), an interleaved amplifier may be formed by interleaving the stages of the first group with the stages of the second group. The gain stages may be interleaved so that at least one stage of each group is between two stages of the other group. If desired, three or more groups of gain stages may also be interleaved in this way.

Wide-band amplifiers with interleaved gain stages may perform better than non-interleaved amplifiers, because the effects of losses may be minimized by placing them between stages of gain.

The advantages of interleaving amplifier stages from groups of amplifier stages such as the groups of FIGS. 7 and 8 may be illustrated by an example. In this example, two amplifiers, each of which operates in a different wavelength band, are combined by interleaving the individual stages of each amplifier to produce a wide-band amplifier. Each amplifier stage in the first amplifier (amplifier 1) produces a loss in the gain band of the amplifier stages in the other amplifier (amplifier 2).

Figure 13:
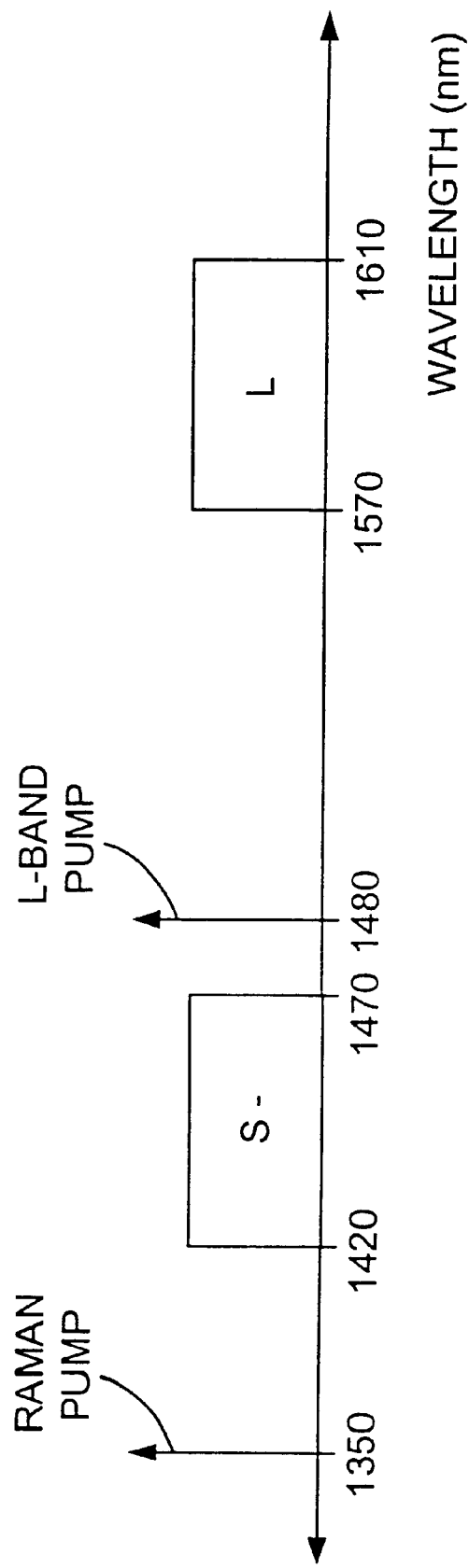
FIG. 13 is a schematic diagram showing the wavelength ranges of operation of an illustrative three-stage L-band erbium-doped fiber amplifier and an illustrative three-stage Raman fiber amplifier.

Amplifier 2 operates in an "S" band of approximately 1420–1470 nm and amplifier 1 operates in the L-band, as shown in FIG. 13. Amplifier 2 may be Raman pumped using one or more pumps. An illustrative Raman pump laser operating at approximately 1350 nm is shown in FIG. 13. Erbium-doped fiber in amplifier 1 may be pumped by 980 nm pumps, 1480 nm pumps, or any other suitable pumps. An illustrative pump operating at 1480 nm is shown in FIG. 13.

Figure 14:
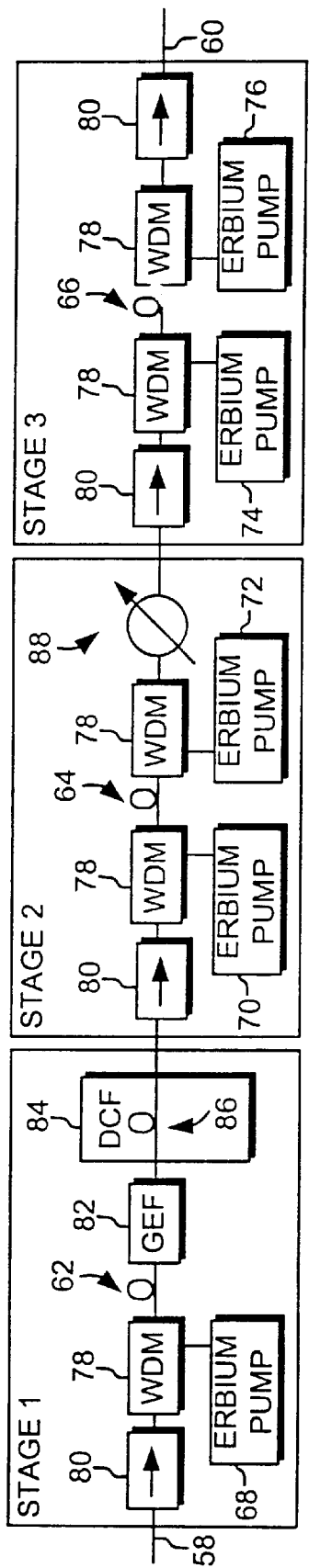
FIG. 14 is a schematic diagram of the illustrative three-stage L-band erbium-doped fiber amplifier.

A schematic diagram for amplifier 1 is shown in FIG. 14. Amplifier 1 is an erbium-doped fiber amplifier designed for L-band use at 1570–1600 nm and has a three-stage design. The design produces a flat gain spectrum for 40 channels at input powers of −18 dBm per channel (i.e., a total input power of −2 dBm). The gain of amplifier 1 is 22 dB.

Input signals may be provided to input fiber 58 and corresponding amplified output signals may be provided at output fiber 60. Erbium-doped fiber coils 62, 64, and 66 may be used to provide gain. Fibers 62, 64, and 66 may be pumped by erbium pumps 68, 70, 72, 74, and 76. The erbium pumps may be diode lasers or other suitable sources of pump light. Pump light from the pumps may be coupled into the erbium-doped fibers using wavelength-division multiplexing couplers 78 or other suitable coupling arrangements. Isolators 80 may be used to reduce noise. Gain equalization filter 82 may be used to flatten the gain spectrum of amplifier 1. Dispersion compensation module 84 may contain dispersion compensating fiber 86 that compensates for chromatic dispersion. Variable optical attenuator 88 may be used to accommodate different input powers per channel.

Pump 68 may be a 100 mW pump operating at 980 nm. Module 84 may contribute 12 dB of loss. The loss of filter 82 may be ignored for the present analysis. Pump 70 may be a 100 mW pump operating at 980 nm. Pump 72 may be a 50 mW pump operating at 1480 nm. Variable optical attenuator 88 may be assumed to contribute a loss of 6 dB. Pumps 74 and 76 may contribute a total of 130 mW of pump power at 1480 nm.

Figure 15:
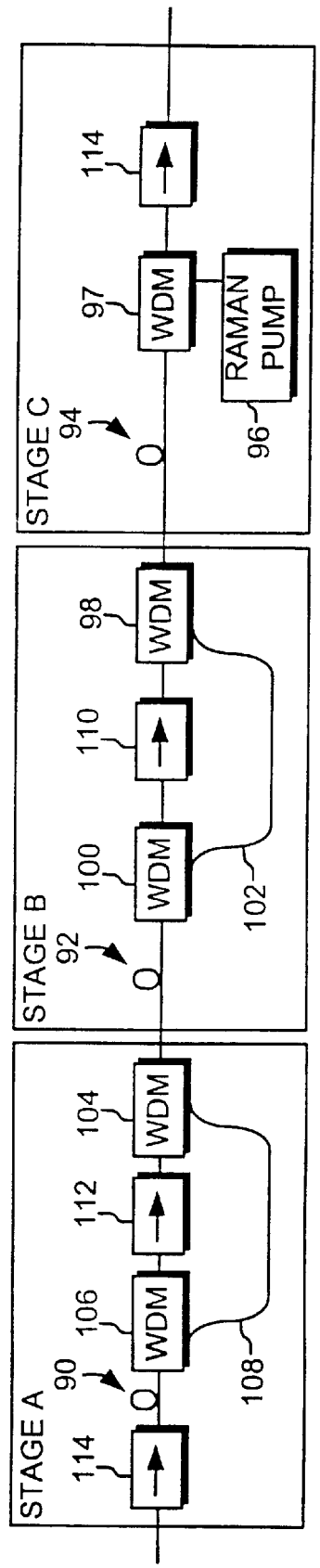
FIG. 15 is a schematic diagram of the illustrative three-stage Raman fiber amplifier.

Amplifier 2 is shown in FIG. 15. Amplifier 2 is a Raman amplifier operating at approximately 1420 nm to 1470 nm. Gain may be provided using Raman fiber coils 90, 92, and 94. Fiber 90, 92, and 94 may be pumped using Raman pump 96. Raman pump 96 may be, for example, a set of diode lasers that produce pump light at multiple wavelengths that produce a flat gain spectrum when combined in Raman fiber 90, 92, and 94. Pump light from pump 96 may be coupled into fiber 94 using wavelength-division multiplexing coupler 97. Bypass arrangements made of couplers 98 and 100 and bypass fiber 102 and made of couplers 104 and 106 and bypass fiber 108 may be used to bypass isolators 110 and 112. Isolators 110, 112, and 114 may be used to reduce noise. The pump light that is directed through the bypass fibers is used to pump fibers 90 and 92.

With this configuration, amplifier 2 may produce 22 dB of flat gain over 40 channels, each of which has an input power of −18 dBm. Amplifier 2 has a three-stage design and is assumed to produce 3 dB of total loss in the L-band. The loss of each stage of amplifier 2 is assumed to be 1 dB.

Figure 16:
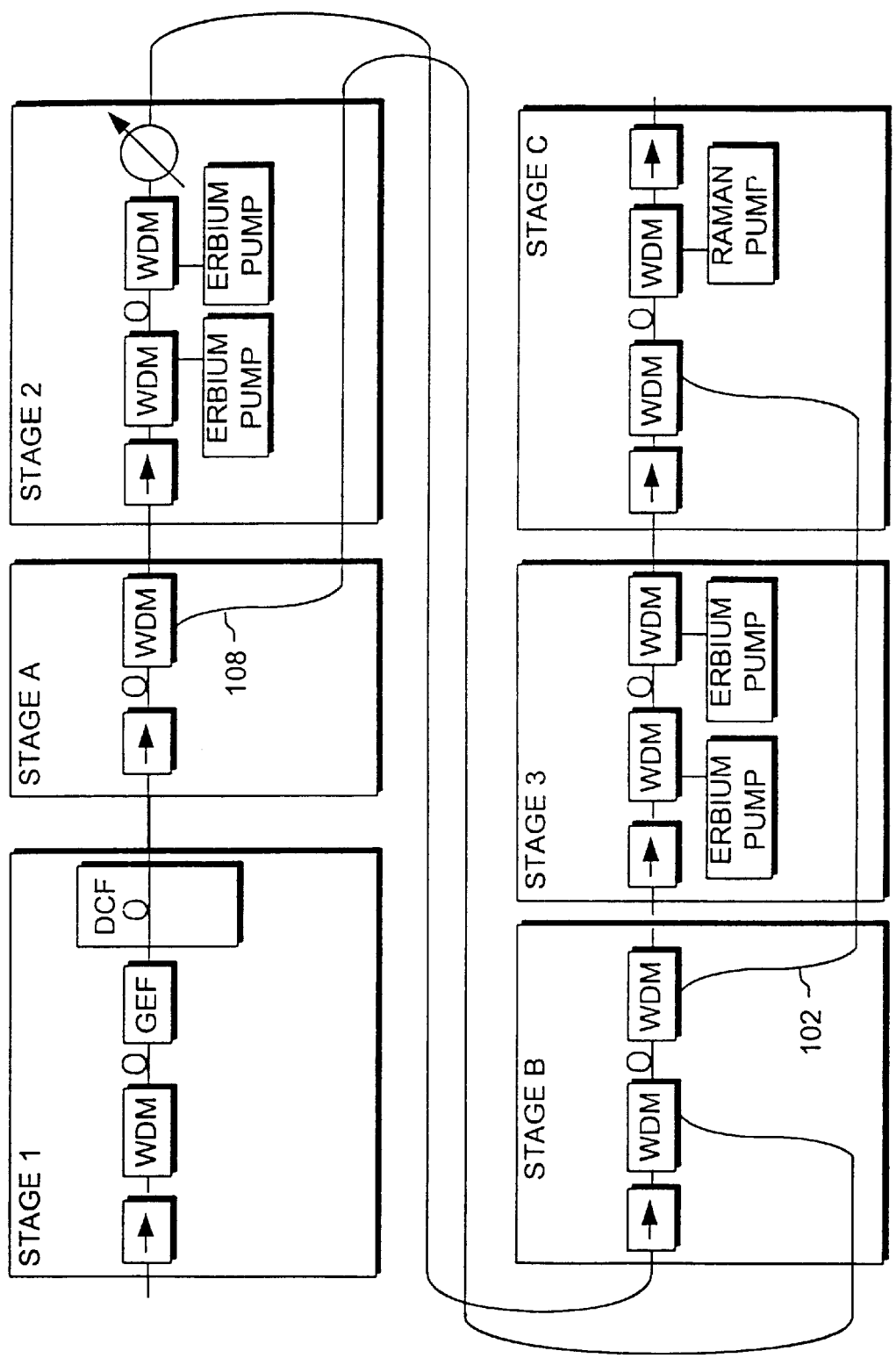
FIG. 16 is a schematic diagram of an illustrative fiber amplifier using interleaved L-band and Raman gain stages selected from the stages of FIGS. 14 and 15 in accordance with the present invention.

One illustrative way in which the stages of amplifier 1 and amplifier 2 may be interleaved is shown in FIG. 16. In this example, the stages are interleaved, so that the first stage of amplifier 1 is the first stage of the interleaved wide-band amplifier. Modifications may be made to the amplifier stages when the interleaved amplifier is formed. For example, the bypass fibers 108 and 102 may be rerouted to bypass the erbium stages as well as the isolators in the amplifier, as shown in FIG. 16.

The results of modeling the performance of various combinations of amplifiers 1 and 2 are shown in table 1. For simplicity, the table only shows the effects of interleaving on the L-band erbium amplifier (amplifier 1). There is a corresponding effect on the Raman amplifier (amplifier 2). As shown in table 1, forming a wide-band amplifier by combining the gain stages of amplifiers 1 and 2, degrades L-band amplifier performance in terms of output power, noise figure, or both, depending on the configuration of the combined amplifier. However, the two interleaved amplifier configurations exhibit a better balance for noise figure and output power degradation than either of the non-interleaved configurations. For example, the last configuration of table 1 exhibits less than a 0.5 dB power penalty and less than a 0.8 dB noise figure penalty.

TABLE 1

| Configuration | Total L-band Output Power | Worst L-band channel noise figure |
|---|---|---|
| Amplifier 1 (L) alone | 19.90 dBm | 6.30 dB |
| Amplifier 1 (L) followed by amplifier 2 (S⁻) | 16.90 dBm | 6.30 dB |

TABLE 1-continued

| Configuration | Total L-band Output Power | Worst L-band channel noise figure |
|---|---|---|
| Amplifier 2 (S⁻) followed by amplifier 1 (L) | 19.86 dBm | 8.08 dB |
| Interleaved, L first, stages alternating (FIG. 16) | 18.64 dBm | 6.61 dB |
| Interleaved, S⁻ first, stages alternating | 19.62 dBm | 7.06 dB |

The interleaving approach may be used in any optical amplifier, and particularly in any amplifier for fiber-optic communications systems. For example, C-band erbium-doped fiber amplifier stages may be interleaved with L-band or S-band (S or S) Raman amplifier stages. L-band erbium-doped fiber amplifier stages may be interleaved with C-band Raman amplifier stages. L-band erbium-doped fiber amplifier stages may also be interleaved with S Raman amplifier stages, as described above. If desired, a group of erbium-doped fiber amplifier stages (e.g., a group of L-band erbium stages or a group of C-band erbium stages) may be interleaved with other rare-earth-doped fiber amplifier stages (e.g., amplifier stages based on praseodymium or neodymium or other rare-earth-doped fibers). In configurations in which rare-earth-doped fiber stages of different types are interleaved, the rare-earth-doped fiber stages may be configured so that the wavelength bands of each type of amplifier stage do not substantially overlap. This will ensure that the operation of one type of stage will not interfere with the operation of the other type of stage.

Figure 17:
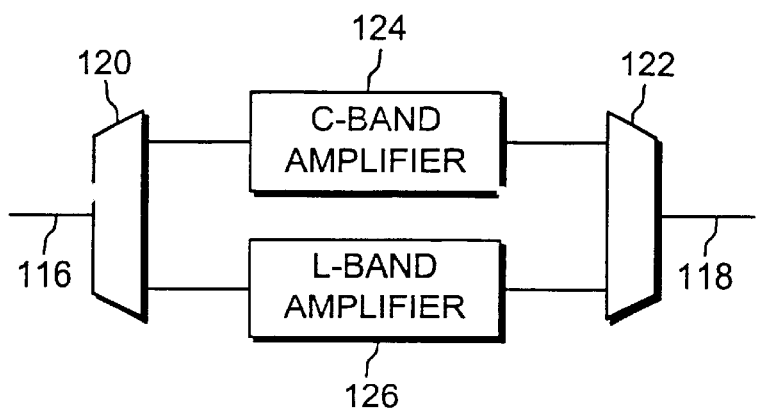
FIG. 17 is a schematic diagram of a parallel C/L amplifier in accordance with the present invention.

Amplifiers and amplifier stages may be used that have parallel branches. For example, arrangements may be used that have parallel C-band and L-band erbium-doped fiber amplifier branches, as shown in FIG. 17. In the C/L amplifier configuration of FIG. 17, input signals may be provided to input fiber 116. Corresponding amplified output signals may be provided to fiber output 118. A wavelength demultiplexer 120 and a wavelength multiplexer 122 may be used to direct input signals in the C-band through C-band amplifier branch 124 and to direct input signals in the L-band through L-band amplifier branch 126.

Figure 18:
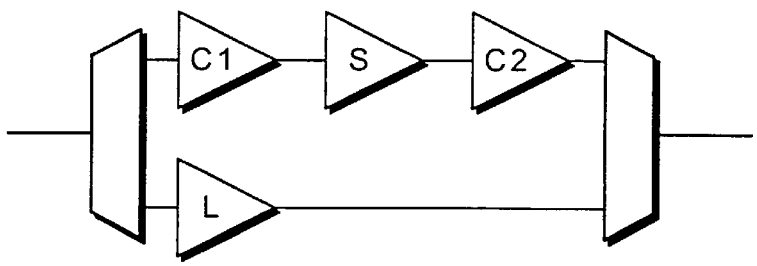
FIG. 18 is a schematic diagram of an illustrative amplifier with parallel branches having interleaved amplifier stages on one of the parallel branches in accordance with the present invention.

A wide-band amplifier may be created by combining S-band Raman stages with the arrangement of FIG. 17. For example, an S-band Raman amplifier stage S may be placed between individual C-band amplifier stages C1 and C2 in the C-branch of a parallel C/L amplifier, as shown in FIG. 18. If desired, additional S-band gain stages may be interleaved with the C-band gain stages in the C-band branch. S-band gain stages may alternatively be interleaved with the L-band gain stages in the L-band branch of the FIG. 18 amplifier.

Figure 19:
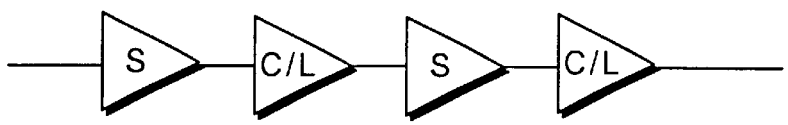
FIG. 19 is a schematic diagram of an illustrative amplifier with interleaved S and C/L stages in accordance with the present invention.

Another way in which to interleave S-band stages with combined C/L amplifier stages is to alternate S and C/L stages, as shown in FIG. 19.

These arrangements are merely illustrative. Any other suitable amplifier gain stage combinations may be used to provide wide-band gain if desired.

It will be understood that the foregoing is merely illustrative of the principles of this invention, and that various modifications can be made by those skilled in the art without departing from the scope and spirit of the invention.

What is claimed is:

1. An optical amplifier that amplifies optical signals on channels at different wavelengths in a fiber-optic communications link, comprising:

a first group of gain stages that amplifies optical signals in a first wavelength band; and a second group of gain stages that amplifies optical signals in a second wavelength band, wherein the first wavelength band extends from a first wavelength to a second wavelength, wherein the second wavelength band extends from the second wavelength to a third wavelength, wherein the first wavelength is shorter than the second wavelength, wherein the second wavelength is shorter than the third wavelength, wherein the first group of gain stages is interleaved with the second group of gain stages, and wherein the optical signals pass through each of the gain stages in the first and second groups of gain stages.

2. The interleaved optical amplifier defined in claim 1 wherein the second wavelength band is the L-band.

3. The interleaved optical amplifier defined in claim 1 wherein the first group of gain stages comprises Raman gain stages.

4. The interleaved optical amplifier defined in claim 1 wherein the second group of gain stages comprises erbium-doped fiber gain stages.

5. The interleaved optical amplifier defined in claim 1 wherein the first group of gain stages comprises Raman gain stages and wherein the second group of gain stages comprises erbium-doped fiber gain stages.

6. The interleaved optical amplifier defined in claim 1 wherein the first group includes at least three gain stages and wherein the second group includes at least three gain stages.

7. The interleaved optical amplifier defined in claim 1 wherein the gain stages in the first group alternate with the gain stages in the second group.

8. The interleaved optical amplifier defined in claim 1 wherein the first group of gain stages comprises a group of S-band gain stages and the second group of gain stages comprises a group of L-band gain stages.

9. The interleaved optical amplifier defined in claim 1 wherein at least one of the gain stages in the first group contributes optical loss in the second wavelength band.

10. The interleaved optical amplifier defined in claim 1 wherein at least one of the gain stages in the second group contributes optical loss in the first wavelength band.

11. An optical amplifier that amplifies optical signals on channels at different wavelengths in a fiber-optic communications link, comprising:

a wavelength demultiplexer and a wavelength multiplexer that provide first and second parallel paths for the optical signals in the amplifier, wherein the optical signals are separated into each of the parallel paths from a single fiber path by the demultiplexer based on wavelength and are recombined onto a single fiber path by the multiplexer;

at least one gain stage in the first path that provides optical gain for the optical signals on the first path; and a plurality of interleaved gain stages in the second path that provide optical gain for the optical signals on the second path, wherein the interleaved gain stages include gain stages that provide gain in different wavelength bands.

12. The optical amplifier defined in claim 11 wherein the first path includes an L-band amplifier stage.

13. The optical amplifier defined in claim 11 wherein the interleaved gain stages include:

a first group of gain stages that amplifies optical signals in a first wavelength band; and a second group of gain stages that amplifies optical signals in a second wavelength band, wherein the first wavelength band extends from a first wavelength to a second wavelength, wherein the second wavelength band extends from the second wavelength to a third wavelength, wherein the first wavelength is shorter than the second wavelength, wherein the second wavelength is shorter than the third wavelength, wherein the first group of gain stages is interleaved with the second group of gain stages, and wherein the optical signals pass through each of the gain stages in the first and second groups of gain stages.

14. The optical amplifier defined in claim 11 wherein the gain stage in the first path comprises an erbium-doped fiber amplifier stage.

15. The optical amplifier defined in claim 11 wherein the interleaved gain stages in the second path include erbium-doped-fiber and Raman gain stages.

16. The optical amplifier defined in claim 11 wherein the gain stage in the first path comprises an erbium-doped fiber amplifier stage and wherein the interleaved gain stages in the second path include erbium-doped-fiber and Raman gain stages.

17. An optical amplifier that amplifies optical signals on channels at different wavelengths in a fiber-optic communications link, comprising:

a first group of multiple gain stages that amplifies optical signals in a first wavelength band; and a second group of multiple gain stages that amplifies optical signals in a second wavelength band, wherein the first wavelength band extends from a first wavelength to a second wavelength, wherein the second wavelength band extends from the second wavelength to a third wavelength, wherein the first wavelength is shorter than the second wavelength, wherein the second wavelength is shorter than the third wavelength, wherein the first group of gain stages is interleaved with the second group of gain stages, wherein the optical signals pass through each of the gain stages in the first and second groups of gain stages, wherein at least one of the second group of gain stages is a gain stage that has parallel branches, and wherein each of the parallel branches amplifies a different wavelength band.

18. An optical amplifier that amplifies optical signals on channels at different wavelengths in a fiber-optic communications link, comprising:

a first group of one or more gain stages that amplifies optical signals in a first wavelength band; and a second group of one or more gain stages that amplifies optical signals in a second wavelength band, wherein the first wavelength band extends from a first wavelength to a second wavelength, wherein the second wavelength band extends from the second wavelength to a third wavelength, wherein the first wavelength is shorter than the second wavelength, wherein the second wavelength is shorter than the third wavelength, wherein the first group of gain stages is interleaved with the second group of gain stages, wherein the optical signals pass through each of the gain stages in the first and second groups of gain stages, wherein at least one of the second group of gain stages is a gain stage that has parallel branches, and wherein each of the parallel branches amplifies a different wavelength band.

19. The optical amplifier defined in claim 18 wherein the first group of gain stages amplifies in the S-band.

20. The optical amplifier defined in claim 18 wherein the wavelengths between the first wavelength and the second wavelength are in the C-band and L-band.

21. The optical amplifier defined in claim 18 wherein the first group of gain stages amplifies comprises a group of S-band gain stages and wherein the wavelengths between the first wavelength and the second wavelength are in the C-band and L-band

* * * * *